United States Patent [19]

Gerber

[11] Patent Number: 5,303,947
[45] Date of Patent: Apr. 19, 1994

[54] TRAILER HITCH AND TOWING VEHICLE ENCLOSURE APPARATUS

[76] Inventor: Charles C. Gerber, 1695 E. County Rd. D, Apt. 106, Maplewood, Minn. 55109

[21] Appl. No.: 757,974

[22] Filed: Sep. 12, 1991

[51] Int. Cl.⁵ .............................................. B60P 7/04
[52] U.S. Cl. .................................. 280/423.1; 296/100
[58] Field of Search ................... 280/423.1, 446.1; 296/100

[56] References Cited

U.S. PATENT DOCUMENTS

| D. 109,995 | 6/1938 | De Sakhnoffsky . | |
|---|---|---|---|
| D. 271,009 | 10/1983 | Fishler | D12/16 |
| 3,574,363 | 4/1971 | Stephenson | 287/21 |
| 3,704,924 | 12/1972 | Lowry | 308/136 |
| 3,770,297 | 11/1973 | Quick | 280/423 |
| 3,801,136 | 4/1974 | Cunha | 280/433 |
| 3,811,707 | 5/1974 | Jeambey | 280/423 |
| 3,843,158 | 10/1974 | Schwellenbach | 280/403 |
| 3,936,077 | 2/1976 | Bliek | 280/423 |
| 4,188,058 | 2/1980 | Resa et al. | 296/208 |
| 4,216,990 | 8/1980 | Musgrove et al. | 296/213 |
| 4,353,589 | 10/1982 | Hartberg | 296/50 |
| 4,541,651 | 9/1985 | Koster | 280/433 |
| 4,542,911 | 9/1985 | Mulligan | 296/100 X |
| 4,601,485 | 7/1986 | Furchak | 280/423 |
| 4,614,355 | 9/1986 | Koch | 280/438 |
| 4,669,748 | 6/1987 | LeVee | 280/423 |
| 4,832,359 | 5/1989 | Rafi-Zadeh | 296/176 X |
| 5,056,856 | 10/1991 | Pederson | 296/100 |

OTHER PUBLICATIONS

Advertising Brochure of Classic Pick Up Covers of North Highlands, California.
Advertising Brochure of Donco Manufacturing, Inc., of Indio, California.

Primary Examiner—Joseph D. Pape
Attorney, Agent, or Firm—Merchant, Gould, Smith, Edell, Welter & Schmidt

[57] ABSTRACT

An improved enclosure for increasing the sealed storage capacity of pick-up boxes of vehicles that tow fifth-wheel camping or recreational vehicles or fifth-wheel utility or horse trailer vehicles is disclosed. The enclosure forms a weatherproof seal with the box in a manner that seals the entire box except for around the hitch and for a hitching access path from the tailgate to the hitch. A wear-resistant plate and flexible boot combination cooperate with a cradle assembly to provide a weatherproof seal and to direct rain out of the box. The enclosure assembly requires no connections with the towed vehicle.

29 Claims, 6 Drawing Sheets

TRAILER HITCH AND TOWING VEHICLE ENCLOSURE APPARATUS

BACKGROUND OF THE INVENTION

1. Field of the Invention

This invention relates generally to towing vehicles and more particularly to a hitch and enclosure configuration for a pick-up truck adapted to tow recreational fifth-wheel, horse or utility fifth-wheel trailers.

2. Description of the Art

Fifth-wheel trailers have become a popular form of recreational vehicle due to the increased living area provided by the forward portion of the vehicle, which extends over the back of the towing vehicle without increasing the overall length of the combined towing and towed vehicles. Such recreational vehicles are normally towed by a conventional pick-up truck, with the towing hitch mounted within the box of the truck so as to generally overlie the truck's rear axle. The general followed procedure for connecting the trailer for towing by the pick-up truck is to position the trailer's hitching apparatus at a vertical height that is slightly above that of the towing vehicle's hitching mechanism mounted in the box of the pick-up truck, to lower the pick-up truck tailgate, and to align and back the pick-up truck toward the trailer until the trailer's hitch matingly engages the hitch mounted on the pick-up. For pick-up's with conventional tailgates, the tailgate must be lowered and raised before and after the hitching process in order to respectively enable unimpeded movement of the trailer hitch within the pick-up box and to re-close the end of the box.

Most purchasers of fifth-wheel camping or recreational vehicle trailers prefer to use most or all of the pick-up box area not used by the hitch, for storage of valuables. A number of enclosure configurations have been designed for such purpose, which generally include one or more weatherproof and lockable storage compartments. For storage reasons it is desirable to have the entire pick-up box volume enclosed. However, the hitch portion mounted in the central portion of the box makes such enclosure difficult. Since the hitch assembly moves in operative use, a solid hitch enclosure for fifth-wheel vehicles is generally impractical. Therefore, a number of enclosure designs have left the hitch assembly area unenclosed. One problem with leaving the hitch assembly open to the environment is that rain water can collect within the pick-up bed, thereby damaging the contents of the box or otherwise making it unsuitable for storage purposes. It would also be desirable to protect the hitching apparatus itself from the external environment.

Various techniques have been employed to enclose the hitch assembly, but all such attempts have heretofore been impractical. One technique uses a cover or lid member that is secured in place rearward of the hitch assembly once the trailer is secured to the hitching assembly. Due to the relatively small clearance between the bottom of the overhanging trailer portion and the top surfaces of the pick-up sidewalls, it is difficult and time consuming to secure such an enclosing lid in place. Furthermore, the lid must be physically removed before the trailer can be detached. Another approach has been to enclose the hitch assembly by means of a flexible boot assembly extending from a cover of the pick-up box, up toward the underside of the forward portion of the trailer. Such prior art boots are typically secured to the trailer by means of straps or flexible chord members that are hooked to the underside of the trailer once the trailer has been secured to the hitch. Such process is tedious and time consuming. Also, such method does not provide a weatherproof seal to the hitch area and rain or mist can still enter the pick-up box cavity through the top of such boot. Further, such techniques are unreliable since the straps and fasteners used can be pulled apart as a result of relative twisting and turning motion between the trailer and pick-up box as the trailer is towed and require the boot to be detached from the trailer when making sharp corners, or when backing into tight spaces.

The present invention addresses these shortcomings of the prior art and provides a reliable, secure means for weatherproofing the hitch assembly in a manner that maintains the security of the enclosed storage areas of the pick-up box, and in a manner that requires no additional connections to the trailer. The present invention provides such an apparatus that eliminates rain water from entering the box. Except for those operations requiring activation of the hitch linkage mechanism, the present invention does not require an operator to move any pieces or parts of the enclosure assembly during the hitching or unhitching operations, nor does it require him to raise or lower the tailgate during such operations.

SUMMARY OF THE INVENTION

The present invention provides an improved technique and apparatus for maximizing the available storage area in a pick-up box of a towing vehicle by weatherproofing all of the enclosable storage volume of the box except for that portion required to make hitching connection to the hitch mounted in the box and for an unimpeded hitching access path continuously extending from the rear of the box to the mounted hitch assembly. According to one aspect of the invention there is provided a detachable enclosure apparatus for use with a towing vehicle of the type having a hitching apparatus mounted in a box of the vehicle which defines an enclosable cavity, comprising means sized and configured to be secured to the box for forming a seal around the hitch so as to enclose the box cavity from the external environment except for that portion of the box extending from the rear of the box to the hitch, which provides an unobstructed hitching access port to enable ready connection to a trailer by simply backing the towing vehicle into hitching engagement with the trailer. The enclosure apparatus preferably includes a flexible boot structure which is sealably connected around the hitching apparatus mounted in the towing vehicle box. The enclosure apparatus also preferably includes a cradle means extending from the rear of the box to the flexible boot, and means for connecting the boot with the cradle for defining the hitching access path.

According to another aspect of the invention, there is provided an enclosure apparatus for use with a towing vehicle of the type having a box in which a fifth-wheel hitch of the type having a bearing surface retaining hitch member, is mounted, comprising:

(a) a wear-resistant plate member sized and configured to overlie and to be supported by the load bearing surface retaining hitch member;

(b) boot means sized and configured for connection within the towing vehicle box for providing a weatherproof seal; and (c) means for sealably connecting said boot means to said wear-resistant plate member.

The wear-resistant plate means is preferably constructed of plastic material which defines a wear-resistant bearing surface and the boot is preferably of flexible material. The invention would also be extended to include means for connecting the boot means to the vehicle box and for connecting the wear-resistant plate means to the load bearing surface retaining hitch member in a manner such that when operatively installed in a vehicle box, an unobstructed hitching access path is defined from the rear of the box to the installed hitch.

According to yet another aspect of the invention there is provided in combination with a towing vehicle box structure of the type having a floor, front and opposed sidewalls extending upwardly from the floor and a tailgate which cooperatively define an enclosable cavity in which a hitching mechanism is mounted intermediate the tailgate and the front wall, an enclosure apparatus, comprising:

(a) upper cover means sealingly connectable to the front, sidewalls and tailgate of the towing vehicle and defining a hitching access port therethrough continuously extending from a forward position adjacent the hitching mechanism and rearward to the tailgate; and (b) lower enclosure means extending from said upper cover means and downward into the vehicle box structure for sealing the enclosable cavity along the cover access port in a manner such that an unobstructed access channel is provided through the enclosable cavity from the tailgate to the hitching mechanism.

The invention includes a tailgate configuration configured to define an access port therethrough that forms a part of the hitching access port. According to a preferred implementation of the invention, the lower enclosure means includes flexible boot means extending from the upper cover means to the hitching mechanism to form a weatherproof barrier therebetween and a wear-resistant plate means sized and configured to overlie the hitching mechanism which is operatively connected to the boot. In a preferred configuration of the invention, the lower enclosure means includes cradle means operatively connected with the upper cover means and extending from the tailgate to the boot, and attachment means for securing the boot to the cradle means for forming a weatherproof continuum therebetween. In a preferred construction of the invention, the boot is detachably secured to the cradle such that the cradle can be detachably removed and replaced by an upper cover which closes the hitching access port when the towing vehicle is detached from a trailer. The present invention is applicable to use with fifth-wheel camper or recreational vehicle trailer hitches which are mounted in elevated manner relative to the floor of the towing vehicle box, as well as for use with fifth-wheel utility or horse trailer hitching apparatus which is typically mounted at floor level of the towing vehicle box.

While the invention will be described with respect to several embodiments thereof, it will be understood that the invention is not limited to the design specifics of such embodiments, but that the general principles of the invention apply to any and all designs which are included within the scope of the appended claims. Further, while the invention will be described with reference to the use of specific materials, the invention is not to be limited to the use of those materials described. Further, various techniques and means for providing connections and interconnections of portions of the invention will be described with reference to the preferred embodiments. It is understood that other comparable fastening and interconnection techniques could be equally employed within the spirit and intent of this invention. These and other variations of the invention will become apparent to those skilled in the art upon a more detailed description of the invention.

DETAILED DESCRIPTION OF THE INVENTION

Figure 1:
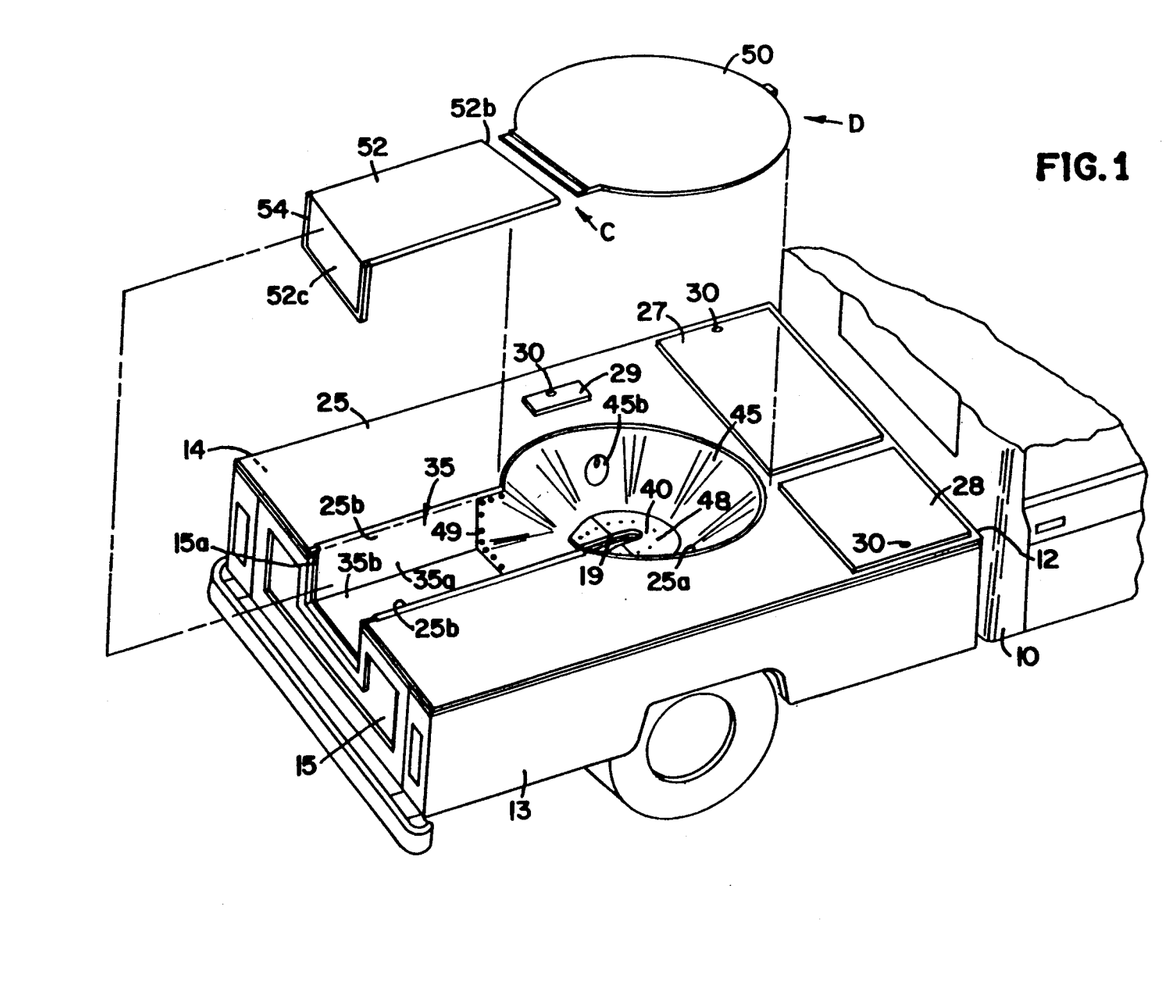
FIG. 1 is a top rear perspective view illustrating one embodiment of an enclosure structure of the present invention for use with fifth-wheel camping or recreational vehicle trailers, illustrating optional cover members in exploded manner.

Referring to the Drawing, wherein like numerals represent like parts throughout the several views, there is generally illustrated in FIG. 1 a first embodiment of the enclosure structure apparatus constructed according to the principles of this invention, as it would appear mounted to a box of a conventional pick-up truck. The apparatus illustrated in FIG. 1 is configured for use with a conventional hitching apparatus of the type used to pull fifth-wheel camping or recreational vehicle trailers. Referring collectively to FIGS. 1 through 8, a conventional pick-up truck is generally illustrated at 10. The truck has a rear box or container generally defined by a bed or floor 11 from which extend in generally perpendicular manner a front wall 12, a pair of oppositely disposed sidewalls 13 and 14 and a tailgate 15. The tailgate 15 pivots about its lower edge in manner well-known in the art, to provide access through the rear of the box to the inner cavity defined by the floor, front and sidewalls thereof.

Figures 4, 5:
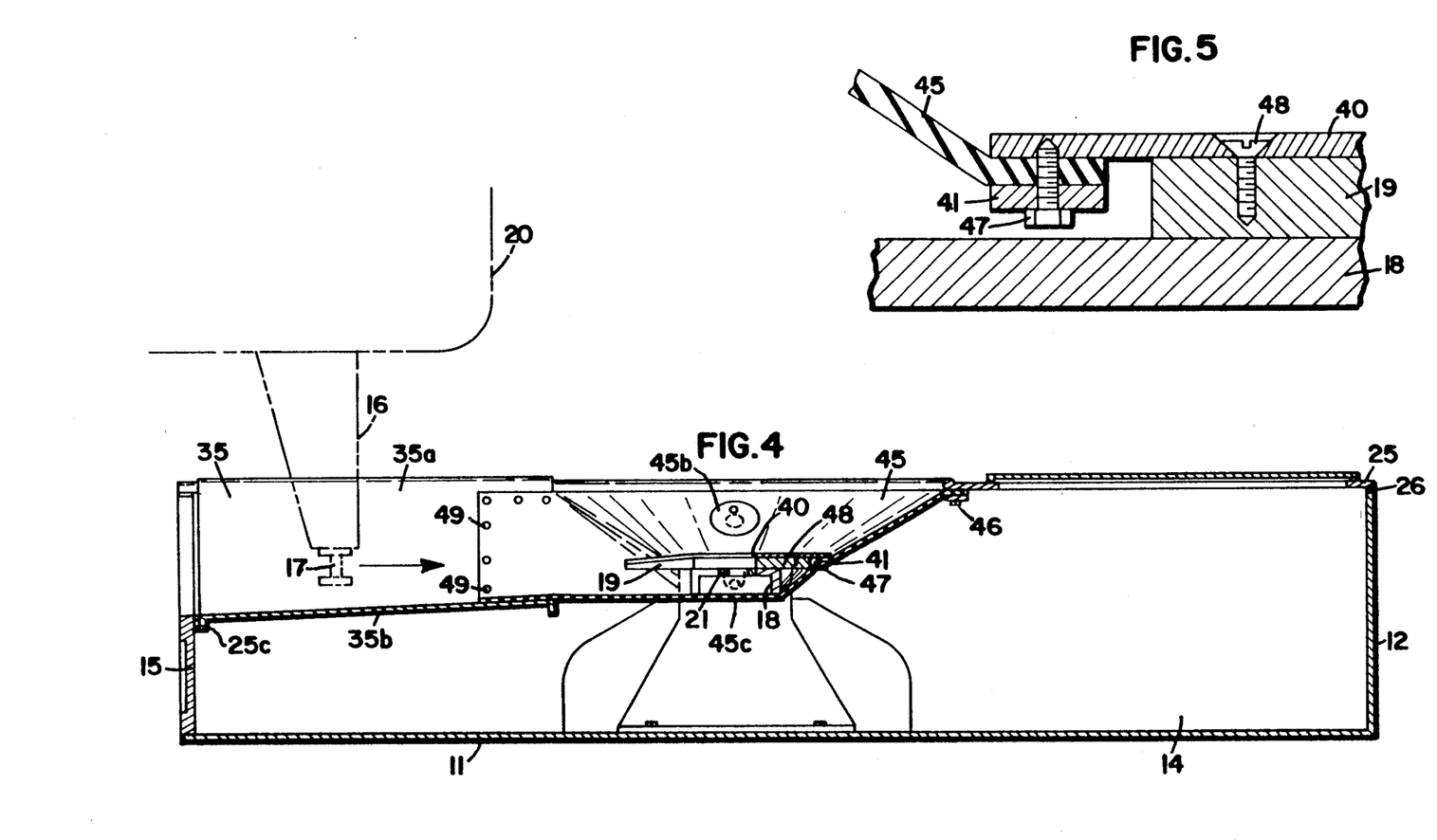
FIG. 4 is a sectional view of the enclosure structure of FIG. 2 generally taken along the Line 4—4 of FIG. 2, and illustrating a fifth-wheel camping or recreational vehicle trailer hitch in phantom.
FIG. 5 is an enlarged detail view of that portion of FIG. 3 referred to by the letter "A" of FIG. 3, illustrating the interconnecting relationship between the boot, wear disk and securing clamp portions of the first embodiment.

Referring to FIG. 4, the forward section of a fifth-wheel vehicle which extends ahead of the main body of the vehicle but does not reach down to the level of the main body, is generally illustrated at 20. The hitching mechanism for towing the fifth-wheel vehicle generally includes a pin box 16 which is connected to the underside of the forward section of the fifth-wheel vehicle and extends generally downward to a coupling pin 17. The coupling pin is cooperatively matingly received by a coupling mechanism mounted within the pick-up truck box, generally by pedestals to the bed or floor of the box. That coupling portion of the hitching assembly which is mounted in the truck bed of the towing vehicle is generally referred to as the "fifth-wheel".

The fifth-wheel coupling mechanism generally includes a support or draw bar member 18 which is appropriately secured to the frame of the towing vehicle through the bed or box of the pick-up truck 10 in manners well-known in the art, a generally C-shaped bearing surface retaining plate 19 and a retainer mechanism (generally designated at 21) for retainably engaging the coupling pin 17. The bearing surface retaining plate 19 has a longitudinal slot 19a that is sized to cooperatively accept the coupling pin 17 in mating engagement. The rearwardly facing arm portions of the bearing surface retaining plate 19 are downwardly sloped in the rearward direction for facilitating attachment of the towed vehicle during the hitching operation. The bearing surface retaining plate 19 is generally pivotally mounted to support bar 18 in a manner well-known in the art. The pin retaining mechanism 21 is typically operable by means of a linkage mechanism (not illustrated) which laterally extends toward one of the sidewalls of the pick-up truck so that the pin retaining mechanism can be moved by an operator during the hitching process to cooperatively secure or release the retaining pin from engagement with the bearing surface retaining plate —all in manner well-known in art. Such hitching mechanisms for towing fifth-wheel vehicles are well-known in the art and will not be detailed herein. For a more complete description of such mechanisms, the reader is referred to U.S. Pat. Nos. 3,801,136; 3,936,077 and 3,704,924 which are herein incorporated by reference to the extent that a further description of the hitching mechanism is desired.

The present invention provides a structure for enclosing in weatherproof manner that portion of the hitching mechanism which is mounted in the pick-up truck bed. A first embodiment of such an enclosure is illustrated in FIGS. 1-7. The first embodiment is particularly applicable for use with fifth-wheel camper or recreational type hitches that are mounted significantly above the floor or bed of the pick-up truck. Referring thereto, a primary cover member 25 is sized to extend from the front wall 12 to the tailgate 15 of the pick-up truck bed and between the opposing sidewalls 13 and 14 thereof. Those outer peripheral edges of the primary cover which engage the front wall 12, the sidewalls 13 and 14 and the tailgate 15 of the pick-up have a seal strip 26 extending along said edges and secured to the bottom of the primary cover for forming a weathertight seal with the respective walls of the pick-up truck enclosure. The forward portion of the primary cover has, in the preferred embodiment, two door members 27 and 28 which are pivotally secured to the primary cover 25 along their respective inside edges for providing access to the inner cavity defined between the primary cover 25 and the pick-up truck box. The edges of the door members 27 and 28 also include peripheral seal members (not illustrated) for forming a weatherproof seal with the top of the primary cover 25. The covers 27 and 28 may also include appropriate extension shock members for retaining the doors in open position to facilitate loading and unloading of articles therethrough. The door members 27 and 28 also preferably include keyed locks (generally designated at 30) for securing the doors to the primary cover. The primary cover 25 also has a third door member 29 located to one side of the cover and in lateral alignment with the fifth-wheel hitch mechanism 19. As previously discussed, the pin retainer mechanism 21 of the fifth-wheel hitch generally includes a linkage mechanism for operating the pin retainer structure, which extends to the sidewall 14 of the pick-up box. The cover 29 enables an operator to reach down into the cavity of the box to operate the linkage mechanism to lock and unlock the pin retainer structure during hitching and unhitching operations. The access door 29 is hinged and sealed in similar manner to doors 27 and 28 and also includes a keyed lock structure 30 which preferably is commonly keyed to locks 30 of doors 27 and 28.

The primary cover 25 has an opening 25a sized and configured to overlie and symmetrically surround the fifth-wheel hitch bearing surface retaining plate 19. The opening 25a is open at its back and extends rearwardly to the truck tailgate 15 along oppositely disposed edges 25b to define an access channel through the primary cover 25 to the fifth-wheel hitch. The upper surface of the primary cover along the opening and access port defining edges 25a and 25b respectively is slightly raised so as to define a raised lip around the perimeter of the central opening in the primary cover. The raised lip is illustrated in more detail at 32 in FIG. 6. The raised lip 32 serves as a retaining guide (as hereinafter described) and also provides a barrier to water on the upper surface of the primary cover from entering the access port defined by the cover edges 25a and 25b.

Figure 2:
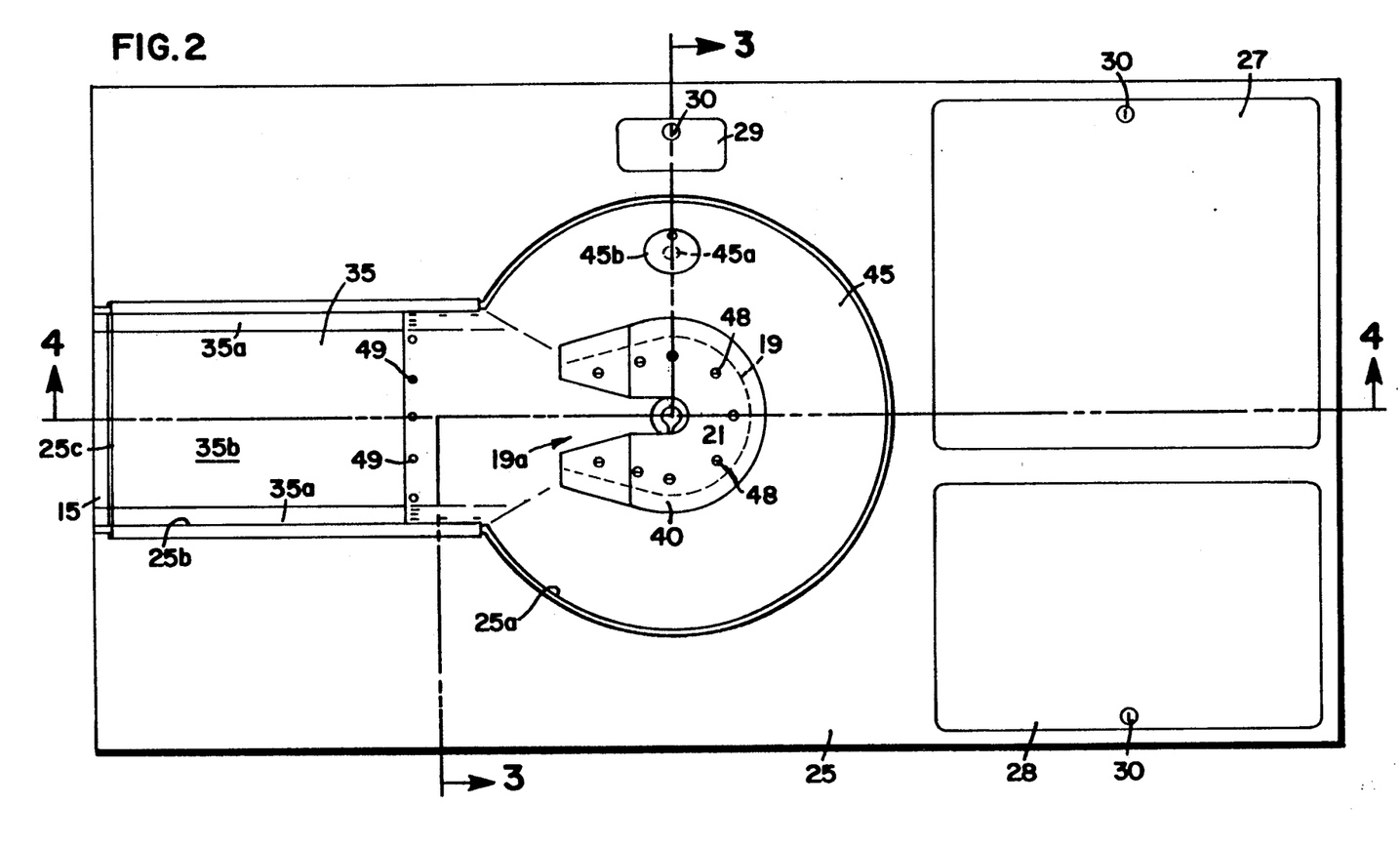
FIG. 2 is a top view of the enclosure structure of FIG. 1.
Figure 6:
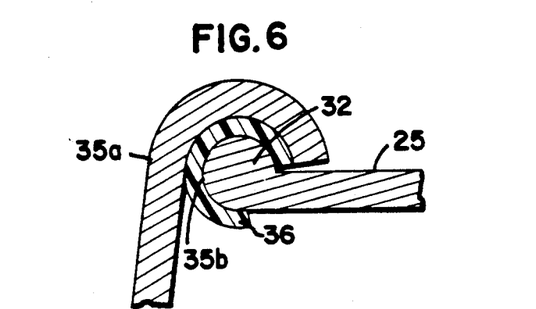
FIG. 6 is an enlarged detail view of that portion of the enclosure structure of FIG. 3 referred to by letter "B" of FIG. 3, illustrating the interface between the side support and center trough portions of the enclosure.
Figure 7:
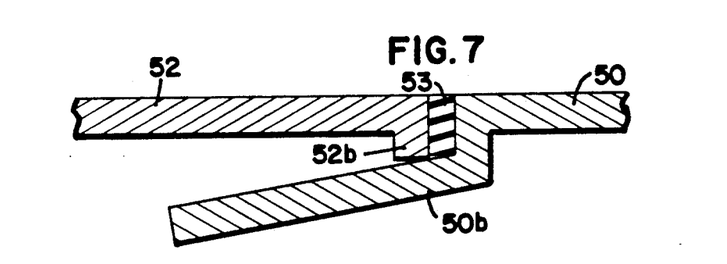
FIG. 7 is an enlarged detail view of that portion of the enclosure structure of FIG. 1 referred to by letter "C" of FIG. 1, illustrating the interface between the two optional cover pieces thereof.

A cradle member 35 having a pair of oppositely disposed sidewalls 35a and a bottom wall 35b is sized and configured to cooperatively engage and slide between the opposing edges 25b of the primary cover 25. The upper edges of the sidewalls 35a of the cradle 35 are arcuately curved in the outer direction (see FIG. 6) and are configured to overlie the protruding lip portion 32 of the primary cover 25. Secured to the inner surface of the upper curved edges of the sidewalls 35a is a tubular sleeve 36 which longitudinally extends along the length of the sidewalls 35a. The sleeve 36 is longitudinally slotted along its outer lower edge so as to cooperatively mate with the lip 32 and the edges 25b of the primary cover 25 as illustrated in FIG. 6. The cooperative mating engagement of the sleeve 36 with the upper lip 32 enables the cradle 35 to be longitudinally slide forward from the ends 25c of the cover toward the fifth-wheel hitch assembly until operatively positioned as illustrated in FIGS. 1 and 2, to define a rearwardly facing trough. The front and rear edges of the sidewalls 35a and bottom wall 35b are flanged at an angle extending from the respective walls and in an outer direction, to provide rigidity to the cradle. The rear flange also includes a peripheral seal strip for providing sealing engagement with the inner surface of the tailgate 15 when raised as illustrated in FIG. 1. Fastener means are provided along the inner forwardly facing portion of the cradle 35, as hereinafter described in more detail. In the preferred embodiment, the fastener means are snap members; however, it will be understood by those skilled in the art that other appropriate detachable fastening means may be provided such as a hook and loop fastener of the type sold under the Velcro ® trademark. The cradle 35 is configured such that when operatively mounted on the primary cover 25 as illustrated in FIG. 1, the bottom wall 35b slopes downwardly toward the tailgate. In a preferred construction of the cradle, the slope is approximately 4 cm from front to back, to direct water along the trough defined by the cradle and out of the tailgate.

In the preferred embodiment, the tailgate 15 of the pick-up truck 10 has been modified with an opening 15a formed therethrough, which is sized and configured to cooperatively mate with the flange at the rear edges of the sidewalls 35a and 35b so as to form a continuous trough from the cradle and through the tailgate to the external environment. Appropriate means for locking the tailgate in place are preferably provided. The tailgate 15 in cooperation with the cradle 35 and the primary cover 25, along with the boot to be hereinafter described, define a weatherproof enclosure for the pick-up box. In the preferred embodiment, the cover 25, its associated doors 27, 28 and 29 and the cradle 35 are all constructed of fiberglass; however, it will be understood that other materials could equally well be employed.

In the preferred embodiment, a replaceable wear plate 40 is sized and configured to overlie the upper surface of the bearing surface retaining plate 19 of the fifth-wheel hitch assembly. The wear plate is preferably constructed of ultra-high molecular weight polyethylene material which provides a tough wear-resistant surface and which eliminates the need for lubricant between the bearing surface of the pin box 16 and the fifth-wheel hitch bearing plate 19. The outer dimension of the wear plate 40 is sized somewhat larger than that of the bearing surface retaining plate 19. The wear plate 40 is, in the preferred embodiment, approximately 4 mm thick, has a central slot which aligns with the slot 19a of the bearing surface retaining plate 19 and has its extending leg portions bent at a downward angle of approximately 20° toward their distal ends so as to cooperatively align with and overlie the rearwardly sloped surfaces of the arm members of the bearing surface retaining plate 19. A C-shaped retainer ring member 41 is sized extend along the outer lower periphery of the wear plate 40, and has a width so as to cooperatively mate with the wear plate 40 in that peripheral region thereof which extends beyond the outer periphery of the bearing surface retaining plate 19 (as will be discussed in more detail hereinafter with reference to the attachment of the boot to the wear plate).

Sealing enclosure with the primary cover 25 and cradle 35 around the fifth-wheel hitch assembly is provided by means of a boot 45 which is preferably constructed of a marine vinyl material. It will be understood that the boot could be constructed of other flexible materials as well such as rubber or the like. The boot 45 is sized to cooperatively engage the lower surface of the primary cover 25 the opening 25a thereof, and to be secured at the rearward portion thereof to the cradle 35. The "upper" (as viewed in FIG. 1) portion of the boot 45 preferably has a wire hoop segment or other retaining means sewn or glued along its outer edge so as to allow the boot to retain its shape at the upper end when fastened to the underside of the cover 25. The boot 45 is secured to the underside of the primary cover 25 around the peripheral edge 25a of the opening by appropriate fastening means such as by clamps, snaps, Velcro ®, or the like, as generally indicated at 46 in FIGS. 3 and 4. The boot 45 has a hole formed therethrough (indicated at 45a in FIG. 2) for providing an access port therethrough for electrical cables extending from the towed vehicle 20 to the pick-up 10. The access port 45a is covered by a flap 45b that is preferably of the same material as that of the boot and which is simply pivotally attached to the boot as illustrated in FIGS. 1–4.

Figure 3:
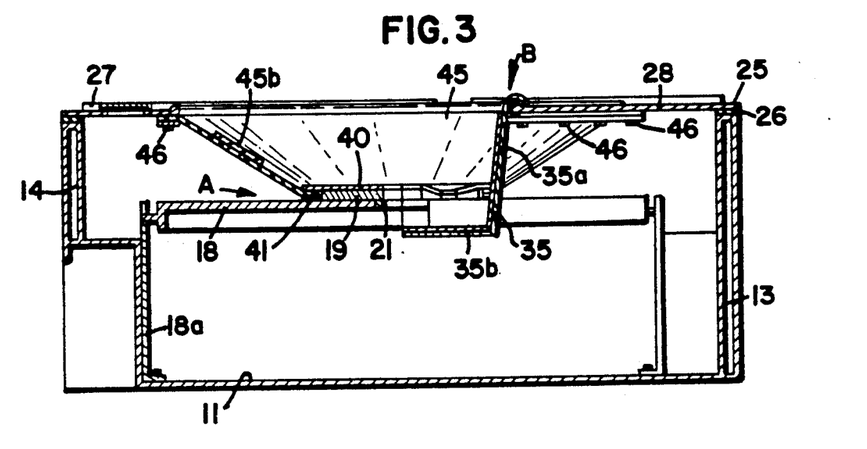
FIG. 3 is a sectional view of the enclosure structure of FIG. 2, generally taken along the Line 3—3 of FIG. 2.

The lower edge of the boot which addresses the fifth-wheel hitch assembly is sandwiched between the C-shaped retainer ring 41 and the wear plate disk 40 around the outer portion of the bearing surface retaining plate that is addressed by the retainer ring 41 as illustrated in FIGS. 3 and 4. The wear plate 40 and the retainer ring 41 are secured together (with the boot therebetween) by means of rivets, clips or other appropriate securing means, as illustrated at 47 in FIGS. 3–5. It should be noted that while a retaining ring assembly is indicated for securing the boot to the wear plate, the boot could be directly secured to the wear plate by other means such as glue or the like. The wear plate 40, boot 45 and retainer ring 41 assembly is secured in operative overlying relation to the bearing surface retaining plate by screws or bolts 48, or alternatively by mounting brackets (not illustrated). An extension portion 45c of the boot 45 extends under the bearing surface retaining plate and support structure and underlies and laterally extends beyond the pin retaining slot 19a.

The boot extension 45c is secured to the hitch assembly beyond the slot 19a and at a slightly elevated position such that any moisture falling through the slot 19a will be collected by the boot extension 45c and will be directed rearward, for subsequent expulsion by way of the boot and cradle from the pick-up box. The combination of the boot and wear plate 40 makes a weatherproof seal of the opening in the cover 25 around the fifth-wheel hitch assembly. In the preferred embodiment, the rearward edge of the boot 45 is releasably secured to the sidewalls 35a and the bottom wall 35b of the cradle 35 by means of a plurality of snaps 49. It will be understood by those skilled in the art that other detachable attachments means could equally well be provided such as a hook and loop fastener of the type sold under the Velcro ® trademark.

As suggested by the foregoing description, the enclosure of the pick-up box by the first embodiment is readily provided by first securing the primary cover assembly 25 (with the boot 45 and wear plate 40/41 assembly attached) to the pick-up box, by sliding the cradle 35 along the retaining edges 25b of the cover 25 into operative position as illustrated in FIGS. 1 and 2, by securing the wear plate 40 and retainer ring 41 assembly to the fifth-wheel hitch retainer plate 19 and by fastening the rearward edge of the boot 45 by means of the fasteners 49 to the cradle 35. When the tailgate 15 is raised into sealing engagement with the rearward ends of the cover 25 and the cradle 35, the interior cavity of the pick-up box will be secured from the elements, and will be in a condition which will allow direct engagement and hitching to a fifth-wheel vehicle 20 simply by aligning the pick-up with the fifth-wheel vehicle and backing the pick-up toward the vehicle to be towed. As the pick-up moves relative to the fifth-wheel vehicle, the coupling pin and its associated pin box assembly will advance along the cradle 35 and into coupling engagement with the bearing surface retaining plate 19—without the need for dropping or raising the tailgate and without the need for providing any subsequent sealing steps in order to seal the pick-up box cavity from the elements following the hitching operation. When the coupling pin is cooperatively engaged by the bearing surface retaining plate 19, the operator simply opens the access door 29 to operate the linkage mechanism for the pin retainer assembly 21 and connects any electrical cables necessary for towing purposes through the boot access port 45a, and the hitching operation is complete. The interior cavity of the pick-up box is protected from the environment by the enclosure mechanism. Any rain which enters the central opening portions of the cover 25 will be directed by the boot and cradle assembly rearwardly and out through the opening 15a in the tailgate.

The invention does not necessarily require use of a rigid upper cover member such as the primary cover 25. The pick-up box area could also be entirely enclosed about the hitch assembly, while providing the desired unobstructed hitching access to the fifth-wheel hitch, by an enlarged boot apparatus extending from the hitch (or from a wear plate) to the peripheral walls and tailgate of the pick-up box. In such configuration, the boot would serve the function of both upper and lower enclosure means for the box. Although not illustrated in the figures, the mechanics of constructing such an enlarged boot configuration would be obvious to those skilled in the art in light of the disclosure herein.

Figure 8:
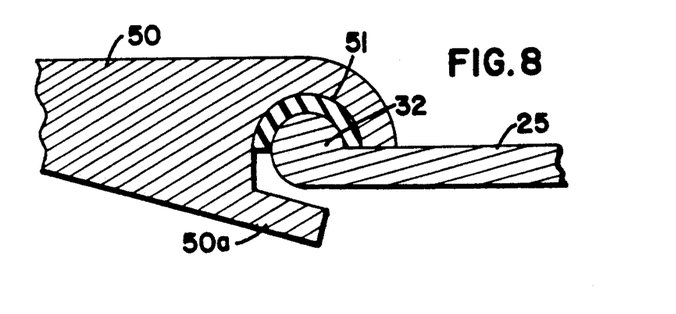
FIG. 8 is an enlarged detail view of that portion of the enclosure structure of FIG. 1 referred to by letter "D" of FIG. 1, illustrating the interface between the removable forward cover member and the primary support panel.

Referring to FIG. 1, an optional hard cover assembly for the first embodiment configuration is provided for the enclosure when the fifth-wheel vehicle is detached from the pick-up truck. In such instances, it may be desirable to maintain a secure (lockable) enclosure to the pick-up box, which cannot be provided by the flexible boot material. For such instances, a cover member 50 is provided for enclosing the front opening portion of the primary cover which is defined by the peripheral edge 25a. The outer peripheral edge of the cover is arcuately shaped downward from its upper surface (as illustrated in FIG. 8) to cooperatively overlie the raised lip 32 of the cover 25. A seal gasket material 51 lines the lower surface of the arcuate flange, to provide a weatherproof seal with the upper surface of the primary cover 25. A forwardly projecting tab 50a projects from the lower surface of the cover and is designed to engage the lower surface of the primary cover 25 to hold the circular cover in place until finally secured by the second cover member to be described hereinafter. The rearwardly facing edge 50b of cover 50 defines a flange seat.

A second cover member 52 is rectangularly shaped and sized and configured to cooperatively slide between the opposed edges 25b of the primary cover 25 and has slidable attachment sleeve members extending along its longitudinal edges 52a which are identical to those described with respect to the cradle 35. The forward edge 52b of the second cover member 52 is configured to cooperatively engage the rear edge flange 50b of the cover, as the second cover member is slid forward into engagement with cover 50. As the forward edge 52b of the second cover 52 slidably engages the downwardly tapered rear edge flange 50b of cover 50, cover 50 is forced in a downward direction so as to compress the seal 51 around its periphery. As the second cover member 52 is further advanced into its final engagement position, a seal member 53 along its leading edge is compressed against the trailing edge of cover 50 to complete the seal between covers 50 and 52. The downward retaining force provided by the second cover member 52 to cover 50 is provided by the engagement between the second cover 52 and the primary cover 25 along its sleeved edges 52a, as will be apparent to those skilled in the art. The trailing edge of the second cover member 52 has a downwardly sloping flange 52c sized to cover the opening 15a in the tailgate 15 and has a seal strip 54 around its peripheral edge to cooperatively and sealingly engage with the inner surface of the tailgate around the tailgate opening. The covers 50 and 52 are preferably made from the same material as the primary cover 25, in the preferred embodiment, such material being fiberglass.

The cover members 50 and 52 can be readily stored within the internal cavity of the pick-up box when the pick-up is towing a fifth-wheel vehicle. When the vehicle is unhitched from the pick-up, the covers can be readily removed from the pick-up box by dropping the tailgate. To secure the covers 50 and 52 to the primary cover 25, the rear edge of the boot 45 is unfastened from the cradle 35, and the cradle 35 is removed by sliding it in the rearward direction until it detaches from the cover 25. The cover 50 can then be positioned overlying the forward opening in the cover 25, and the second cover 52 is then forwardly slid into cooperative engagement with cover 50 as above described. The removed cradle 35 can be readily stored within the enclosed cavity of the pick-up box and the tailgate raised to complete the enclosure process. The entire operation can be performed within a matter of minutes.

Figure 9:
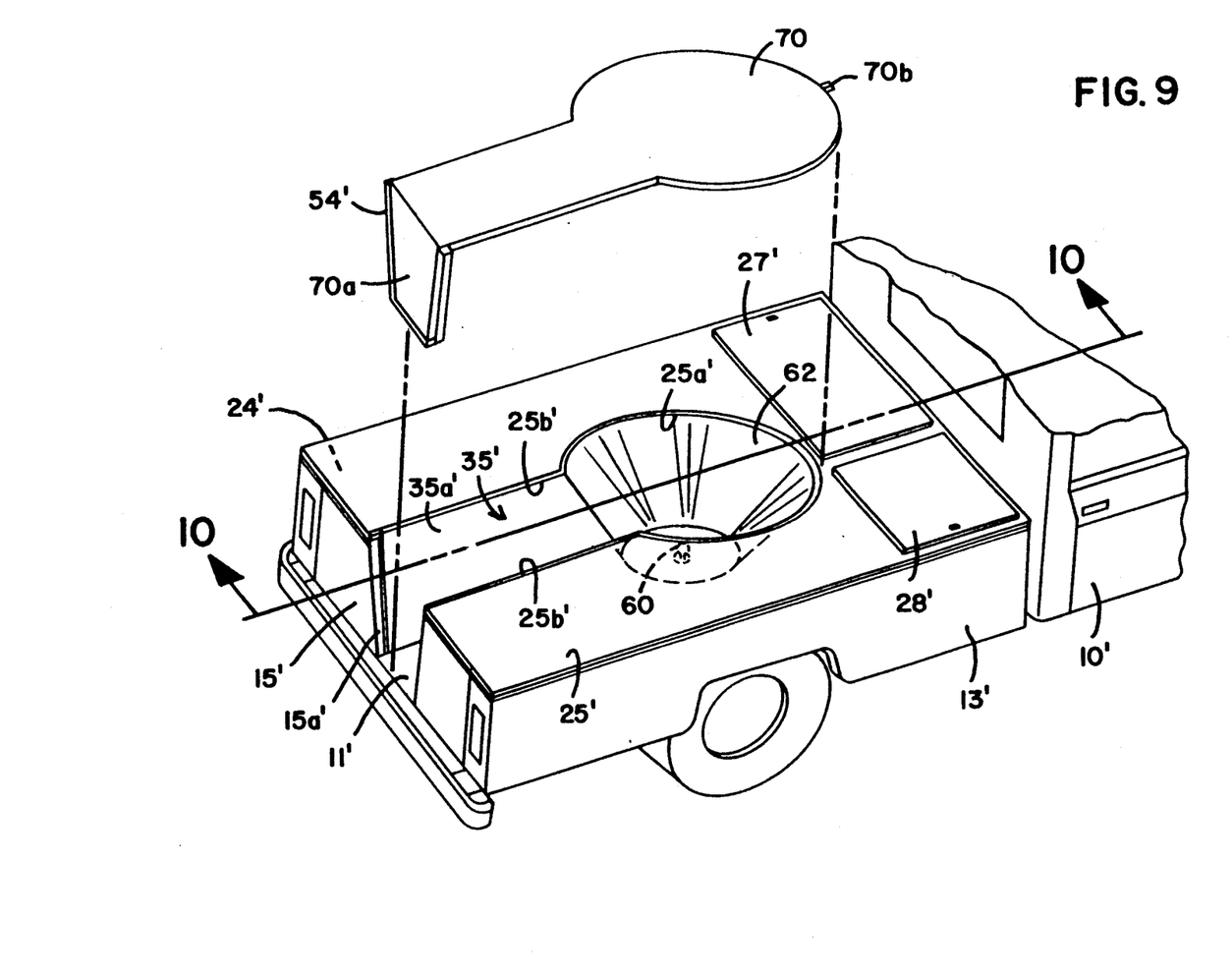
FIG. 9 is a top rear perspective view of an alternate embodiment of an enclosure structure of the present invention for use with fifth-wheel utility or horse trailers, illustrating an optional cover member in exploded manner.
Figure 10:
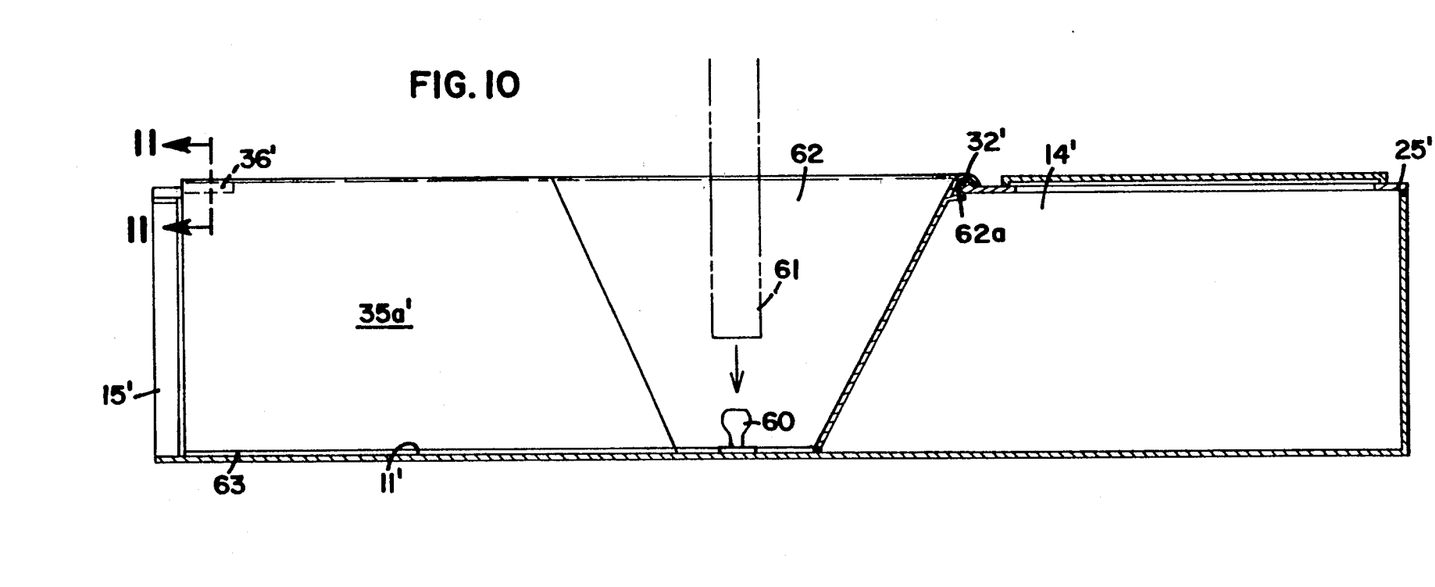
FIG. 10 is a sectional view of the enclosure structure of FIG. 9, generally taken along the Line 10—10 of FIG. 9.

The above-described principles of the invention as applied to the towing of fifth-wheel camping or recreational vehicles, can also be applied to the towing of horse trailers and/or utility trailers which typically use a ball-type hitch member or a simplified fifth-wheel type of hitch that is secured to the floor or bed of a pick-up truck (i.e., is not significantly elevated above the floor as was the case for the fifth-wheel hitch structure described with respect to the first embodiment). A second embodiment of the invention as applicable to use with towing of a horse or utility trailer with such a "low-mounted" hitch assembly, is illustrated in FIGS. 9 and 10. For simplicity in description of the second embodiment, those parts of the second embodiment which correspond to similar parts from the first embodiment will be identified by the same numerals as used with referring to similar parts in the first embodiment, followed by a "prime" designation. Referring to FIGS. 9 and 10, the ball-type hitch member 60 is illustrated as being secured directly to the floor or bed 11' of the pick-up truck. The mating portion of the hitch which is attached to the horse or utility trailer is diagrammatically illustrated at 61 and is cooperatively connectable to a ball-type hitch 60 in manner well-known in the art. It will be understood that although this embodiment of the invention will be described with reference to a ball-type hitch, its principles apply equally well to any type of low-profile, floor mounted hitch. Since the ball hitch 60 is not elevated from the floor of the pick-up, as was the case with the first embodiment, the sidewalls of the cradle portion of the enclosure should preferably extend completely down to the floor 11' and form a seal therewith. Accordingly, for this embodiment of the invention, the cradle 35' does not have a bottom wall similar to the bottom wall 35b of the first embodiment.

As with the first embodiment of the invention, the primary cover member 25' includes a pair of door access panels 27' and 28' and is secured to the upper edges of the pick-up box in the same manner as previously described with respect to the first embodiment. As for the first embodiment, the primary cover 25' has a first edge 25a' which defines a generally circular opening and a pair of longitudinally extending side edges 25b' which define a continuous longitudinal opening from the circular opening which extends through the tailgate 15' of the pick-up. The tailgate 15' is notched at 15a' downward to the bed or floor 11' of the pick-up so as to allow drainage from the bed therethrough. In this embodiment of the invention, the tailgate 15' could be a single-piece tailgate having a thin interconnecting piece extending across the trough area, or could comprise a pair of independently operable tailgates, having no interconnecting portion extending therebetween.

Figure 11:
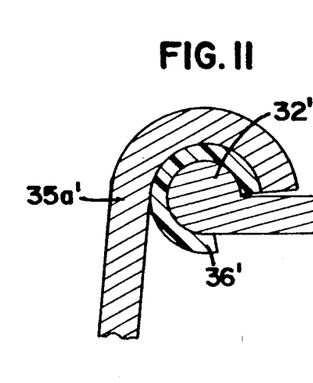
FIG. 11 is a cross-sectional view of the upper portion of the cradle sidewall, generally taken along the line 11—11 of FIG. 10.

The preferred construction of the cradle for the second embodiment of the invention is a single-piece configuration having a pair of oppositely disposed downwardly sloped sidewalls 35a extending from the tailgate 15' to a forward conically shaped forward portion, generally designated at 62. The sidewalls and conically shaped portions of the cradle are, in the preferred embodiment, configured from a single piece of fiberglass material. The upper edges of the sidewalls 35a' and the conical 62 sections define an arcuately shaped upper lip (similar to that described with respect to the first embodiment) for cooperatively engaging with the upper surface of the primary cover 25'. The peripheral edges 25a' and 25b' of the upper cover 25' a raised lip 32', similar to that of the first embodiment. The arcuate upper edges of the cradle assembly cooperatively mate with the raised lip 32' to provide a weathertight seal therewith, in manner similar to that described with respect to the first embodiment. The lower peripheral edges of the sidewalls 35a' and of the conical portion 62 have a seal member 63 attached thereto for providing sealing engagement of the cradle with the floor of the pick-up box. The forward upper edge of the conical portion 62 of the cradle assembly is configured with a tab portion 62a for cooperatively engaging the underside of the upper cover 25' in manner similar to that previously described with respect to tab 50a of circular cover 50. Secured to the inner upper trailing edges of the cradle sidewalls 35a' are a pair of tubular sleeve segments 36' (identical in construction to the sleeves 36 previously described with respect to the first embodiment) which are configured to slidably engage and mate with the lip 32' and the edges 25b' of the upper cover 25' (as illustrated in FIG. 11), for retainably holding the cradle assembly in operative position relative to the upper cover 25' and for maintaining downward pressure to compress the lower seal 63 of the sidewalls 35a' against the pick-up bed 11'. The rearward facing edges of the sidewalls of the cradle sidewalls 35a' also include appropriate seal strips for sealingly engaging the rear edges of the cradle walls to the tailgate 15'. In the preferred embodiment, the diameter of the circular hole 25a' formed within the cover 25' is slightly oversized in the longitudinal direction by a distance equal to the length of the guide sleeves 36' such that the cradle assembly can be positioned within the cover opening slightly rearward of its final operative position as the guide sleeves 36' just engage the rearward edge of the upper cover 25', and can be subsequently slid forward as retained by the guide sleeves 36' to its final resting position as illustrated in FIGS. 9 and 10. The upper extending flanged edges of the cradle assembly adjacent the circular opening are slightly oversized to accommodate the oversized opening such that when operatively positioned in its final resting position, the upper flanges will operatively overlie the entire circular opening to provide a weathertight seal therebetween. When the cradle assembly is thus operatively positioned in the pick-up box, the tailgate is simply raised to secure the assembly in place. As thus assembled, the pick-up can be directly backed into hitching engagement with the horse or utility trailer as above described with respect to the fifth-wheel trailer configuration. When the trailer hitch assembly 61 is aligned with the ball hitch 60, the hitch assembly 61 is simply lowered onto the ball hitch and secured thereto in a manner well-known in the art.

An optional one-piece cover 70 is provided for enclosing the pick-up box so as to use the entire storage capacity thereof, when the pick-up is not being used for towing purposes. The cover 70 has a peripheral shape generally coinciding with the opening configuration in the cover 25' when viewed in top plan, with an extended flange portion configured in arcuately-shaped manner similar to that as previously described with respect to covers 50 and 52. The rear portion of the cover 70 extends downwardly to define a panel 70a for closing the opening 15a' in the tailgate 15, in a manner similar to that previously described with respect to the second cover 52. The forward edge of the cover 70 includes a tab member 70b operable int he same manner as previously described with respect to the tab 50a for cover 50, and a pair of truncated guide sleeve members 36' identical to those of the cradle 35'. To use the protective cover 70, the cradle assembly previously described is simply removed from engagement with the upper cover 25' by moving the cradle assembly in the rearward direction so as to detach the retaining guide sleeves 36' from the cover 25' and the cradle assembly is then simply lifted up out of the pick-up box. The cover 70 is then inserted in place of the cradle assembly in the same manner previously described with respect to the cradle 35', to provide a weatherproof seal of the entire pick-up box cavity.

While the present invention has been described with respect to specific embodiments thereof, it will be understood by those skilled in the art that such disclosure has been merely for the purpose of illustration and that the invention is not to be limited in any manner thereby. Various modifications of the invention will be apparent to those skilled in the art in view of the foregoing example. By way of example only, those skilled in the art will recognize the ability to change dimensions and shapes of the various portions of the invention, to construct the parts thereof from alternative materials, and to secure the parts together by varied means. The scope of the invention is to be limited only by the appended claims.

I claim:

1. In combination with a towing vehicle box structure of the type having a floor, front and opposed sidewalls extending upwardly from the floor and a tailgate all cooperatively defining an enclosable cavity therebetween, and a hitching mechanism mounted to the towing vehicle within the box structure located intermediate the tailgate and the front wall thereof, an enclosure apparatus, comprising:
  (a) upper cover means sealingly connectable to the front, sidewalls and tailgate of the towing vehicle and defining a hitching access port therethrough continuously extending form a forward position adjacent the hitching mechanism and rearward to the tailgate;
  (b) said tailgate being configured to define a tailgate access port therethrough that forms a part of the hitching access port; and
  (c) lower enclosure means extending from said upper cover means and downward into the vehicle box structure for sealing said enclosable cavity along said cover access port in a manner such that an unobstructed access channel is provided through the enclosable cavity from the tailgate to the hitching mechanism.

2. In combination with a towing vehicle box structure of the type having a floor, front and opposed sidewalls extending upwardly from the floor and a tailgate all cooperatively defining an enclosable cavity therebetween, and a hitching mechanism mounted to the towing vehicle within the box structure located intermediate the tailgate and the front wall thereof, an enclosure apparatus, comprising:
  (a) upper cover means sealingly connectable to the front, sidewalls and tailgate of the towing vehicle and defining a hitching access port therethrough continuously extending from a forward position adjacent the hitching and rearward to the tailgate; and
  (b) lower enclosure means extending from said upper cover means and downward into the vehicle box structure for sealing said enclosable cavity along said cover access port in a manner such that an unobstructed access channel is provided through the enclosable cavity from the tailgate to the hitching mechanism; said lower enclosure means including flexible boot means extending from said upper cover means to said hitching mechanism, forming a weatherproof barrier therebetween.

3. The apparatus as recited in claim 2, wherein said boot means is constructed of flexible material.

4. The apparatus as recited in claim 2, including wear-resistant plate means sized and configured to overlie said hitching mechanism for providing a wear-resistant surface for said hitching mechanism, and means for operatively connecting said plate means to said hitching mechanism.

5. The apparatus as recited in claim 4, including means for operatively connecting said boot means to said wear-resistant plate means.

6. The apparatus as recited in claim 2, wherein said lower enclosure includes cradle means operatively connected with cover means and extending from said tailgate to sa- boot means, and attachment means for attaching said boot means to said cradle means for forming a weatherproof continuum therebetween.

7. The apparatus as recited in claim 6, wherein said attachment means includes means for detachably securing said boot means to said cradle means.

8. The apparatus as recited in claim 6, wherein said cradle means is designed and configured to be detachably removed from engagement with said upper cover means and said boot means.

9. The apparatus as recited in claim 8, including means for slidably connecting said cradle means to said upper cover means.

10. The apparatus as recited in claim 9, wherein said slidable connection means is designed and configured to enable said cradle means to be detached from said upper cover means by sliding said cradle means longitudinally of the box structure in the direction of the tailgate thereof.

11. The apparatus as recited in claim 2, including supplemental cover means cooperatively configured to engage said upper cover means, for completely enclosing said access port therethrough, to seal and secure the entire said enclosable cavity.

12. The apparatus as recited in claim 2, wherein said hitching mechanism includes means for connecting to a fifth-wheel camping or recreational trailer vehicle hitch.

13. The apparatus as recited in claim 1, wherein said hitching means includes means for connecting to a fifth-wheel utility or horse trailer vehicle hitch.

14. The apparatus as recited in claim 13, wherein said hitching means comprises a ball-type hitch.

15. The apparatus as recited in claim 1, wherein said lower enclosure means comprises a continuous unitary structure.

16. The apparatus as recited in claim 15, wherein said lower enclosure means can be detachably removed from engagement with said upper cover means.

17. The apparatus as recited in claim 16, including supplemental cover means cooperatively configured to engage said upper cover means for completely enclosing said access port therethrough to seal and secure the entire said enclosable cavity.

18. The apparatus as recited in claim 2, including at least one lockable access panel in said upper cover means for providing selective access through said upper cover means to said enclosable cavity.

19. The apparatus as recited in claim 2, wherein said boot means includes a sealable cable access port therethrough.

20. The apparatus as recited in claim 2, wherein said upper cover means is configured of rigid material.

21. The apparatus as recited in claim 2, wherein said lower enclosure means includes means for directing water flow by gravity from the hitching mechanism in a direction toward the tailgate.

22. An enclosure apparatus for use with a towing vehicle of the type having a box in which a fifth-wheel hitch is mounted, said fifth-wheel hitch being of the type having a load bearing surface retaining hitch member, comprising:
  (a) a wear-resistant plate member sized and configured to overlie and to be supported by the load bearing surface retaining hitch member;
  (b) boot means sized and configured for connection within the towing vehicle box for providing a weatherproof seal; and
  (c) means for sealingly connecting said boot means to said wear-resistant plate member.

23. The enclosure apparatus of claim 22, wherein said wear-resistant plate means is at least partially constructed of plastic material which defines a wear-resistant bearing surface.

24. The enclosure apparatus of claim 22, wherein said boot means is primarily constructed of flexible material.

25. The enclosure apparatus of claim 22, wherein said boot means is configured so as to provide, when installed in the vehicle box, an unobstructed hitching access path from the rear of said box to the point at which the hitch is installed.

26. The enclosure apparatus as recited in claim 22, including means for connecting said wear-resistant plate means to the load bearing surface retaining hitch member, and means for connecting said boot means to the vehicle box.

27. A detachable enclosure apparatus for use with a towing vehicle of the type having a hitching apparatus mounted within a box of the towing vehicle, wherein said box defines an enclosable cavity, comprising means sized and configured to be secured to the box of the towing vehicle for forming a seal connected to said hitching apparatus of the towing vehicle so as to enclose the enclosable cavity from an external environment said seal forming means defining an unobstructed hitching access port leading from the mounted hitching apparatus to the rear of the box.

28. The enclosure apparatus of claim 27, wherein said enclosure apparatus includes in part a flexible boot structure sealably connected around the hitching apparatus.

29. The enclosure apparatus of claim 28, wherein said enclosure apparatus further includes cradle means extending from the rear of the box to said boot structure, and means for operatively connecting said boot structure and said cradle means for defining said hitching access path.

* * * * *

UNITED STATES PATENT AND TRADEMARK OFFICE
CERTIFICATE OF CORRECTION

PATENT NO. : 5,303,947
DATED : April 19, 1994
INVENTOR(S) : Charles C. Gerber

It is certified that error appears in the above-indentified patent and that said Letters Patent is hereby corrected as shown below:

Column 5, line 45, insert --the-- after the word "in".

Column 5, line 49, "U.S. Pat. Nos." should read --U.S. Patents--.

Column 6, line 62, "slide" should read --slid--.

Column 7, line 43, insert --surface retaining-- after the word "bearing".

Column 7, line 54, insert --to-- after the word "sized".

Column 8, line 62, "retainer" should read --bearing surface retaining--.

Column 11, line 26, "35a" should read --35a'--.

Column 11, line 36, insert --define-- after the numeral "25'".

Column 12, line 35, "int he" should read --in the--.

Column 13, line 56, insert --means-- after the word "enclosure".

Column 13, line 58, insert --said upper-- after the word "with".

UNITED STATES PATENT AND TRADEMARK OFFICE
CERTIFICATE OF CORRECTION

PATENT NO. : 5,303,947
DATED : April 19, 1994
INVENTOR(S) : Charles C. Gerber

It is certified that error appears in the above-indentified patent and that said Letters Patent is hereby corrected as shown below:

Column 13, line 59, "sa-" should read --said--.

Signed and Sealed this

Fourth Day of October, 1994

Attest:

BRUCE LEHMAN

*Attesting Officer*    *Commissioner of Patents and Trademarks*